UNITED STATES PATENT OFFICE.

JULIUS H. MATTHES, OF CHICAGO, ILLINOIS, ASSIGNOR TO THE ARKON CARBON CO., OF CHICAGO, ILLINOIS, A CORPORATION OF COLORADO.

PAINT.

1,145,782.  Specification of Letters Patent.  Patented July 6, 1915.

No Drawing. Application filed April 13, 1910, Serial No. 555,247. Renewed September 3, 1914. Serial No. 860,099.

*To all whom it may concern:*

Be it known that I, JULIUS H. MATTHES, a citizen of the United States, and a resident of Chicago, in the county of Cook and State of Illinois, have invented a new and Improved Paint, of which the following is a full, clear, and exact description.

Various types of fusible bitumens of which gilsonite is a very common and highly prized variety, have been used for some time in the production of varnishes. The practice has been to subject the bitumen to the action of heat often in the presence of some fixed oil with which it would form a fluid mass, subsequently thinning the mixture with fluid thinners such as turpentine or benzin. Another practice followed to some extent, is to convert the bitumens into a fluid state by dissolving them in a suitable solvent such as benzin, subsequently adding the dissolved mass if desired to fixed oils or other materials with which the fluid bitumens are miscible.

Bitumens which are nonfusible and relatively insoluble have been considered as worthless by the varnish maker, as the varnishes produced from their use would be full of insoluble particles which heretofore has been considered a defect. Varnishes are fluid mixtures or compounds of oils, gums, thinners, etc., while paints are mixtures of oils or thinners which constitute a vehicle, and pigments which are the finely divided materials substantially insoluble in the vehicle. The use of insoluble bitumens in the oils and thinners would produce a paint rather than a varnish and this serves to distinguish my bitumen pigment from all other bitumens.

A study of dry films produced by painting out a mixture of nonfusible as well as relatively insoluble bitumens with linseed oil has shown me that the paint so produced possesses properties not possessed by the varnishes previously referred to.

Fusible or soluble bitumens mixed with linseed oil undergo a change when exposed to the action of the sun or upon exposure. Disintegration and elimination of free carbon often takes place. With the special type of bitumen that I use as a paint pigment, (not as a constituent of a varnish), this action will not take place. Tests of paint made of the mixtures of my bitumen and linseed oil have shown that this peculiar type of bitumen actually preserves the linseed oil film from decay and renders it of great service in preventing the admittance of moisture or other agencies of decay as well as protecting it from the disintegrating action of the sun. The special bitumen I refer to is one in which the oily portion (petrolenes) is largely absent. Any such asphaltic bitumen or asphaltite (see "*The Asphalt and Bituminous Rock Deposits of the United States*", by George H. Eldridge, United States Geological Survey,) may be used, which is capable of being pulverized to a fine powder. Of the substances classified as asphaltites, I have found certain of what are known in the trade as "grahamites" to be most desirable. Those employed by me must be characterized by being practically insoluble in ordinary paint vehicles. The pigment, pulverized to a fine powder, is mixed or ground with linseed oil, varnish or any other suitable paint vehicle. The pigment is prepared by being pulverized by any suitable means to a fine powder which will pass through about 200 mesh. This powder, the particles of which are hard and friable is then ground or mixed with a suitable drying oil; such as linseed oil, subsequently adding benzin and japan if desired; the pigment may be mixed with any suitable paint vehicle in which the pigment is relatively insoluble. In mixing the pigment with linseed oil I prefer to use one pound of pigment to two pounds of linseed oil.

The object of my invention is to provide a paint which under conditions to which it may be exposed is chemically and electrically passive, non-corrosive and resistant to acids, alkalis and atmospheric influences.

Another object is to provide a paint in which the pigment is held in suspension without settling and which lends to the vehicle a high degree of elasticity, resisting the effects of expansion or contraction and at the same time rendering the vehicle especially resistant to destructive agencies.

Still another object of this invention is to provide a paint for coating porous surfaces, fabrics, textiles, leather, paper compositions, and other similar materials.

Having thus described my invention, I claim as new and desire to secure by Letters Patent:

A drying oil paint containing an asphaltic bitumen as such, in a finely pulverized condition, practically insoluble in the paint vehicle, and infusible at ordinary temperatures for the uses and purposes set forth.

In testimony whereof I have signed my name to this specification in the presence of two subscribing witnesses.

JULIUS H. MATTHES.

Witnesses:
 JULIEN T. BESTOR,
 ETHEL M. BREITUNG.